(12) United States Patent
Terada

(10) Patent No.: US 7,139,073 B1
(45) Date of Patent: Nov. 21, 2006

(54) IMAGING APPARATUS

(75) Inventor: Hirotoshi Terada, Hamamatsu (JP)

(73) Assignee: Hamamatsu Photonics K.K., Shizuoka (JP)

(*) Notice: Subject to any disclaimer, the term of this patent is extended or adjusted under 35 U.S.C. 154(b) by 503 days.

(21) Appl. No.: 10/363,656

(22) PCT Filed: Sep. 4, 2000

(86) PCT No.: PCT/JP00/05985

§ 371 (c)(1),
(2), (4) Date: Mar. 4, 2003

(87) PCT Pub. No.: WO02/21109

PCT Pub. Date: Mar. 14, 2002

(51) Int. Cl.
G01J 3/30 (2006.01)
G01J 3/28 (2006.01)
G01J 1/58 (2006.01)
H01J 40/14 (2006.01)

(52) U.S. Cl. ............... 356/317; 356/326; 250/214 VT; 250/458.1; 250/459.1

(58) Field of Classification Search .. 356/237.2–237.6, 356/317, 337, 432, 445, 326, 346; 250/559.04–559.08, 250/458.1, 459.1, 461.1, 214 VT; 359/368; 348/64, 79, 80, 86–95, 125–134, 195, 202, 348/203, 215.1, 335, 360; 382/141–152, 382/312, 318, 319, 321–323
See application file for complete search history.

(56) References Cited

U.S. PATENT DOCUMENTS 6,134,002 A * 10/2000 Stimson et al. ............. 356/326
6,215,587 B1 * 4/2001 Alfano et al. ............... 359/368

FOREIGN PATENT DOCUMENTS

| JP | 58-041337 | 3/1983 |
| JP | 02-226027 | 9/1990 |
| JP | 04-256841 | 9/1992 |
| JP | 06-331441 | 12/1994 |
| JP | 07-280733 | 10/1995 |
| JP | 07-333234 | 12/1995 |
| JP | 2000-146680 | 5/2000 |
| JP | 2000-180362 | 6/2000 |

* cited by examiner

*Primary Examiner*—Zandra V. Smith
*Assistant Examiner*—Gordon J. Stock, Jr.
(74) *Attorney, Agent, or Firm*—Morgan Lewis & Bockius LLP

(57) ABSTRACT

An image pickup system is equipped with a cylindrical lens CL, which, for a light flux emitted from light source 1, converges only light flux components of a single direction within a section perpendicular to the direction of propagation of the light flux, an objective lens OL, on which the light flux emitted from cylindrical lens CL is made incident after the light flux has passed the convergence position of cylindrical lens CL, and a galvanomirror 3a, which is disposed along the optical path of the abovementioned light flux between cylindrical lens CL and objective lens OL. Light flux emitted from a sample S in accordance with the incidence of a slit-shaped light flux onto sample S is captured by a TV camera 7.

4 Claims, 14 Drawing Sheets

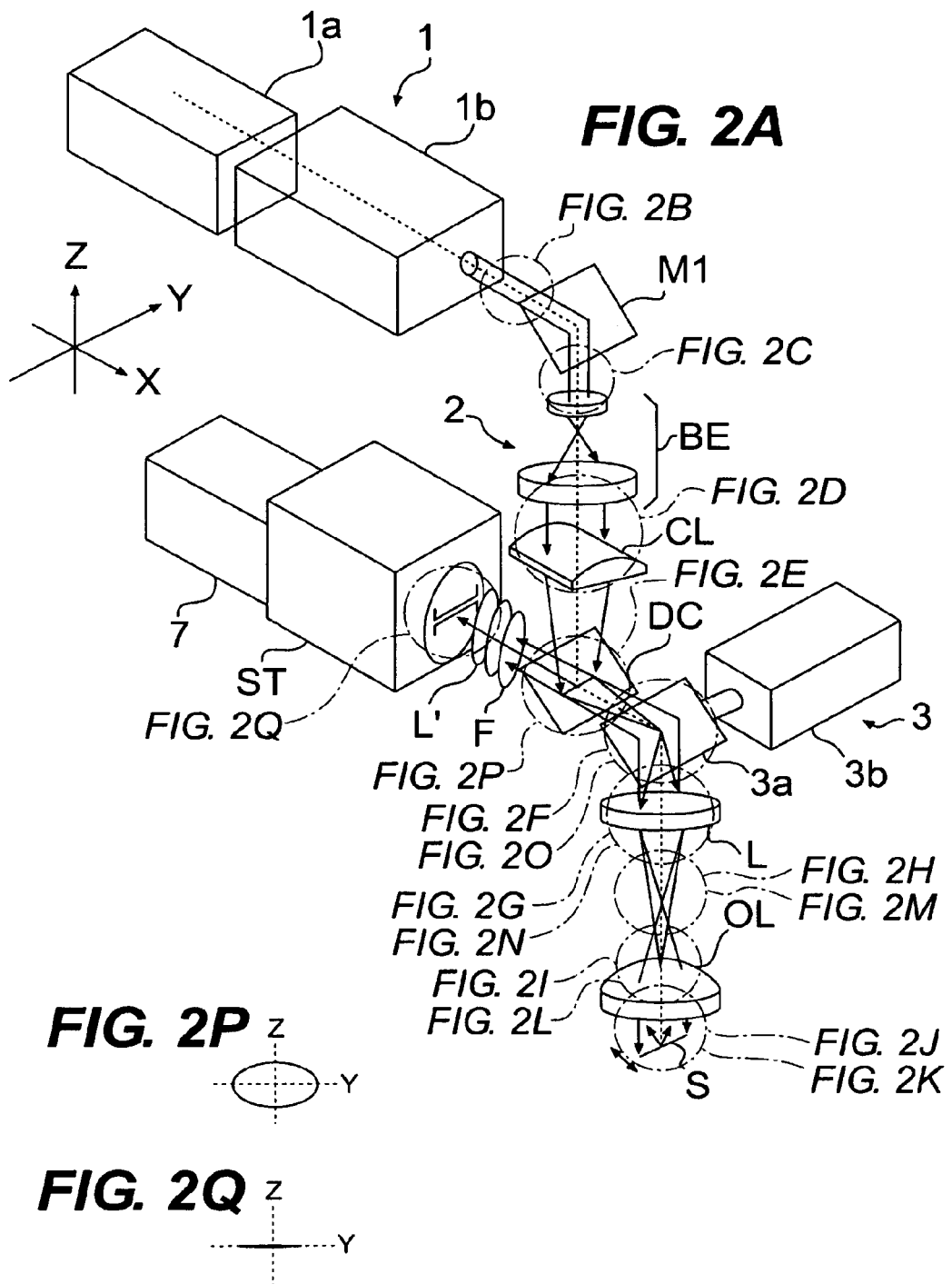

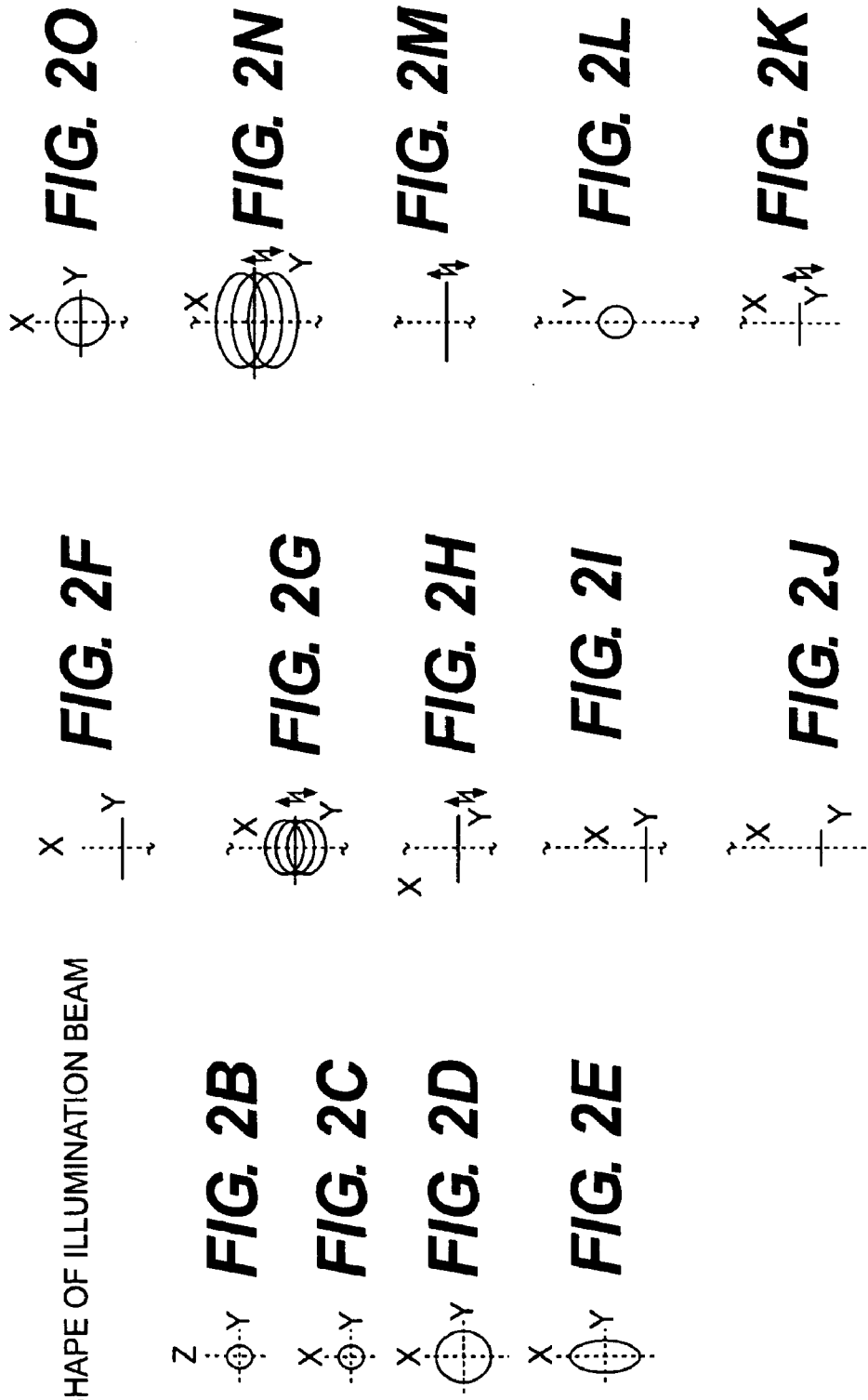

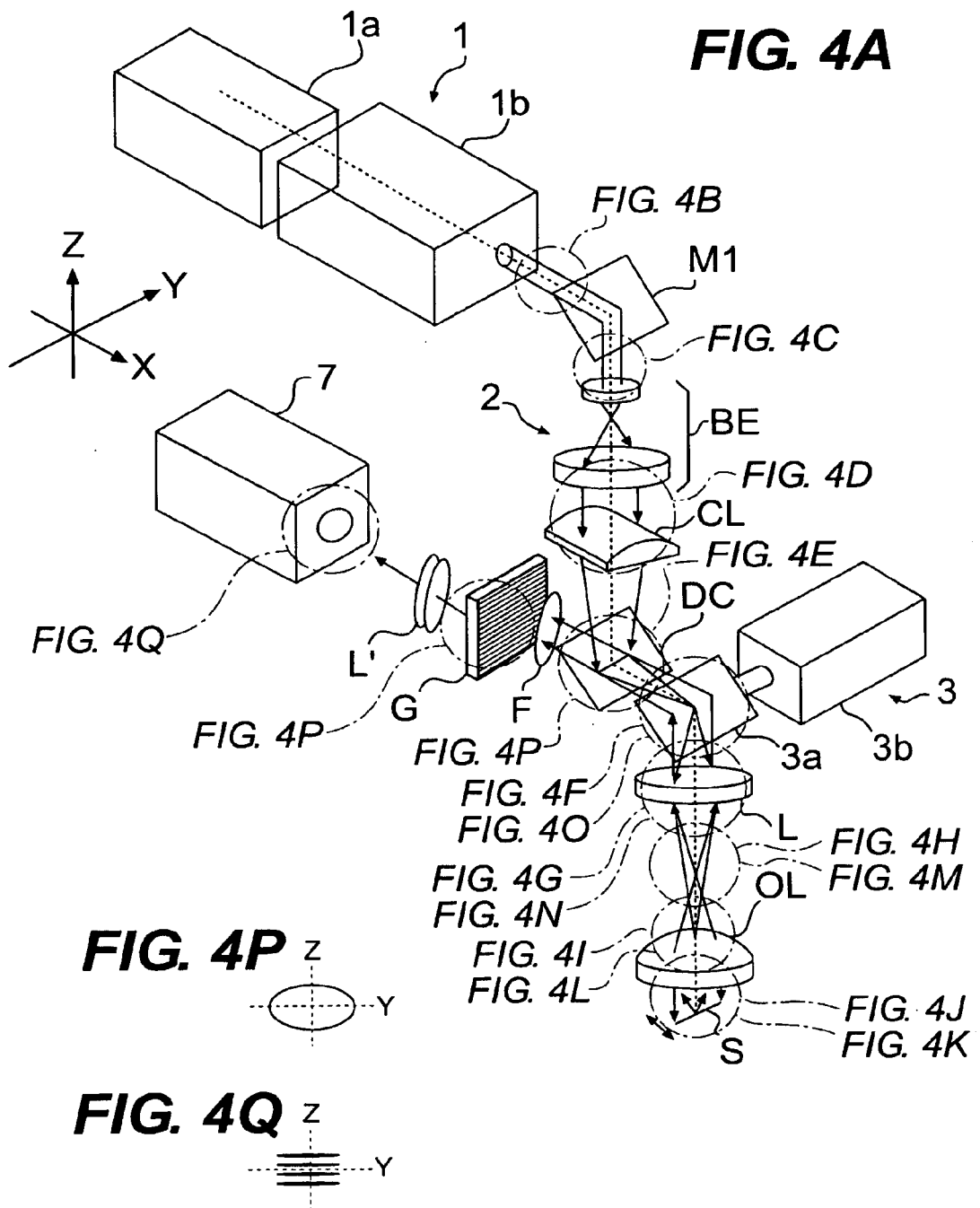

SHAPE OF ILLUMINATION BEAM
*FIG. 4B*
*FIG. 4C*
*FIG. 4D*
*FIG. 4E*
SHAPE OF ILLUMINATED BEAM
*FIG. 4F*
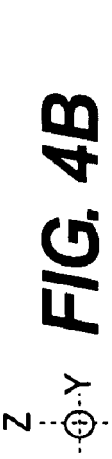
*FIG. 4G*
*FIG. 4H*
*FIG. 4I*
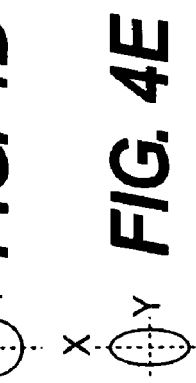
*FIG. 4J*
SHAPE OF DETECTED BEAM
*FIG. 4O*
*FIG. 4N*
*FIG. 4M*
*FIG. 4L*
*FIG. 4K*

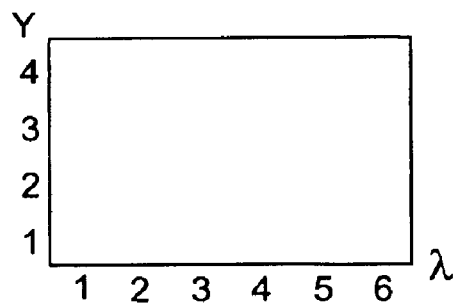
*FIG. 5A*  t=1 (X=1)
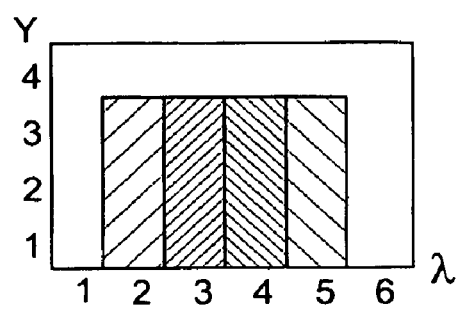
*FIG. 5B*  t=2 (X=2)
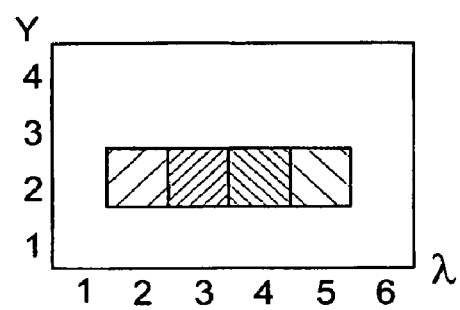
*FIG. 5C*  t=3 (X=3)
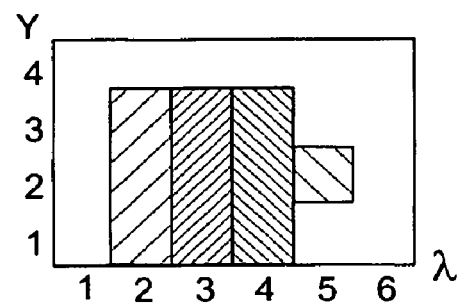
*FIG. 5D*  t=4 (X=4)
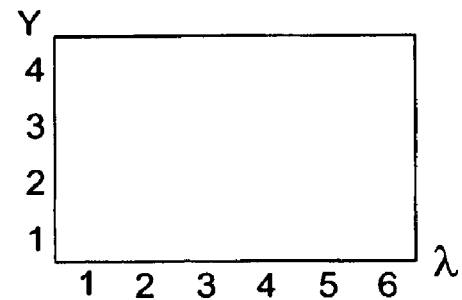
*FIG. 5E*  t=5 (X=5)

FIG. 6A  t=1 (X=1)
FIG. 6B  t=2 (X=2)
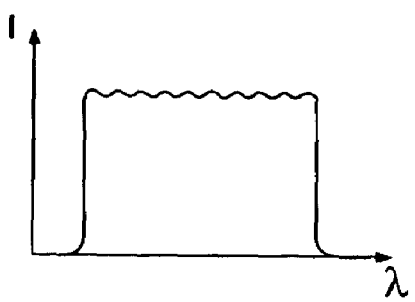
FIG. 6C  t=3 (X=3)
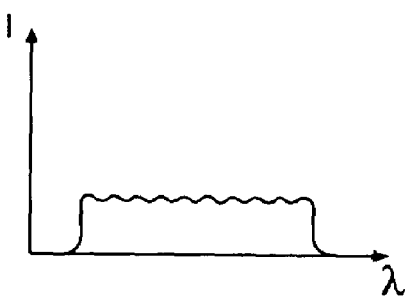
FIG. 6D  t=4 (X=4)
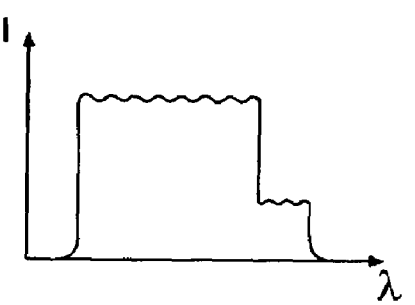
FIG. 6E  t=5 (X=5)

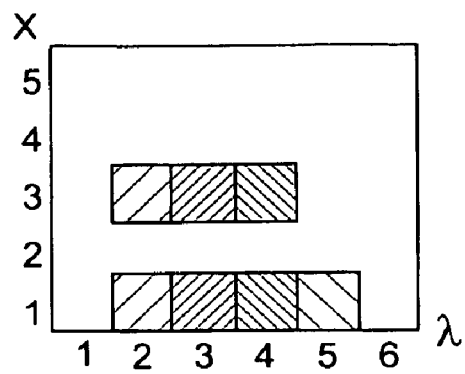
FIG. 8A  Y=1
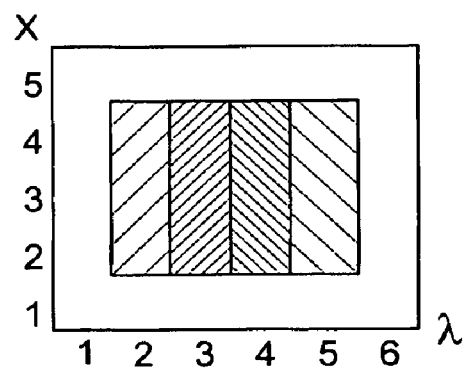
FIG. 8B  Y=2
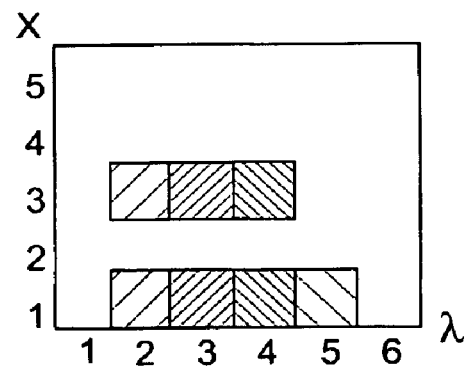
FIG. 8C  Y=3
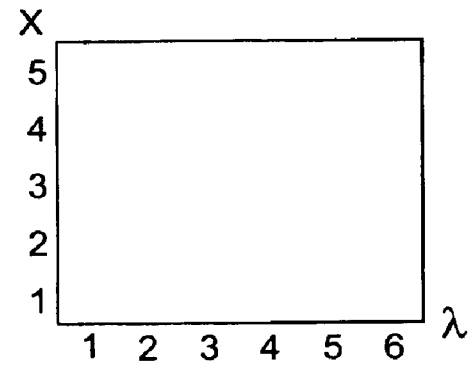
FIG. 8D  Y=4

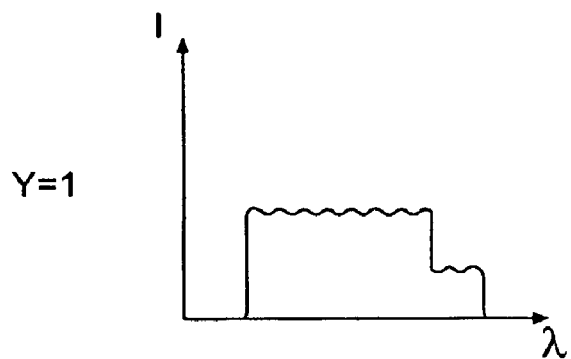
FIG. 9A Y=1
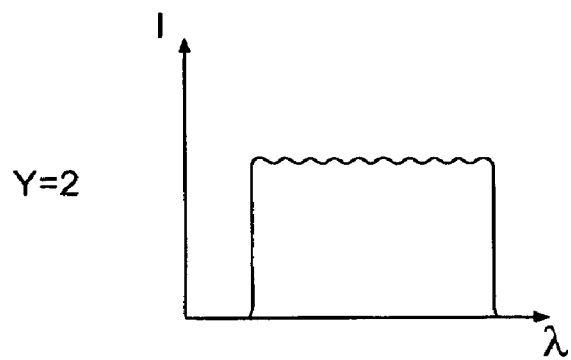
FIG. 9B Y=2
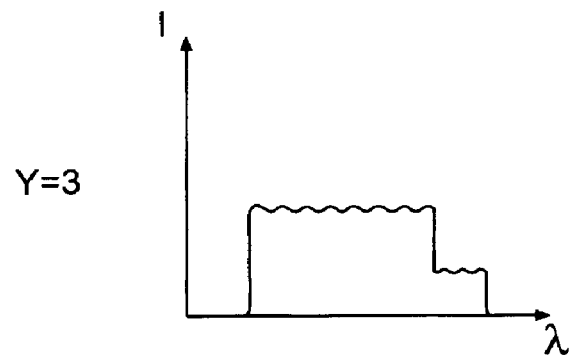
FIG. 9C Y=3
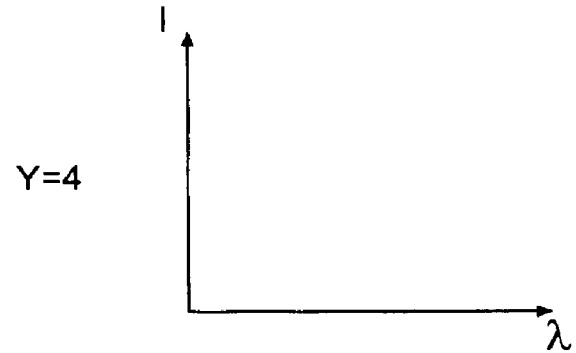
FIG. 9D Y=4

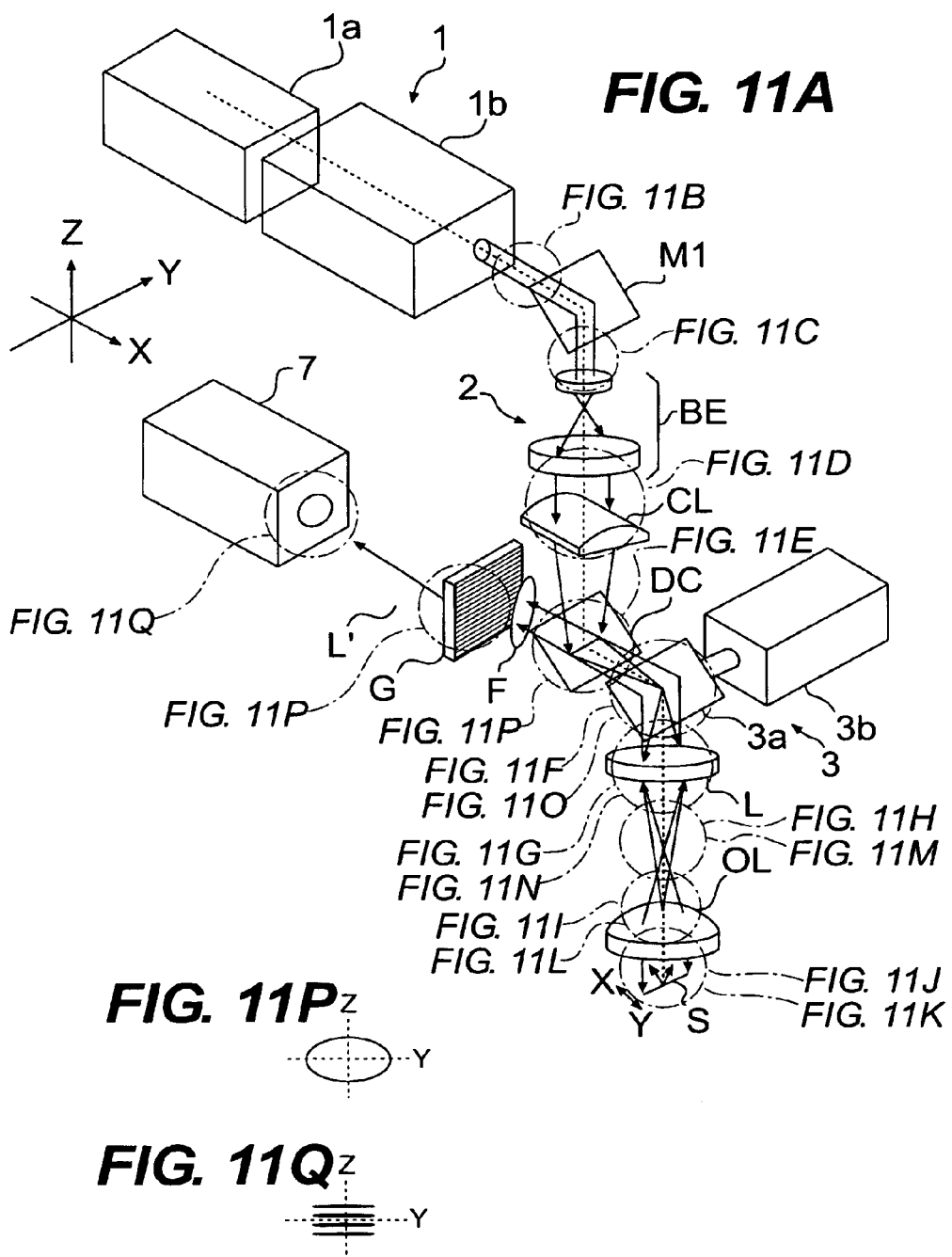

| SHAPE OF ILLUMINATION BEAM | SHAPE OF ILLUMINATED BEAM | | SHAPE OF DETECTED BEAM | |
|---|---|---|---|---|
|  FIG. 11B |  | FIG. 11F | 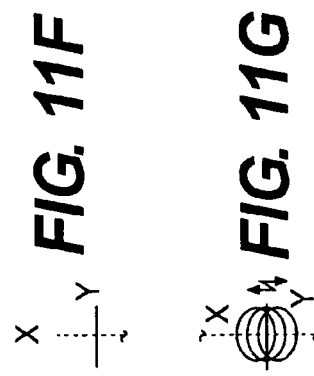 | FIG. 11O |
|  FIG. 11C | | FIG. 11G |  | FIG. 11N |
|  FIG. 11D | | FIG. 11H |  | FIG. 11M |
|  FIG. 11E | | FIG. 11I |  | FIG. 11L |
| | | FIG. 11J | | FIG. 11K |

IMAGING APPARATUS

FIELD OF THE ART

This invention relates to an image pickup system, which projects a slit-shaped light flux onto a sample and captures light flux emitted from the sample in accordance with the incidence of the abovementioned slit-shaped light flux.

BACKGROUND ART

A prior-art device for obtaining wavelength-resolved images is described in Patent Publication No. 2,558,864 by this applicant. With this device, a sample is illuminated uniformly from the rear side, an image of the transmitted light that has been transmitted through the sample is formed on a slit plate, a galvanomirror is used to scan the transmitted light image that is projected onto the slit plate and thereby cut out a slit image, this slit image is subject to spectral resolution, and spectrally resolved images are captured by a TV camera. Images captured by the TV camera are synthesized as sample images according to wavelength.

DISCLOSURE OF THE INVENTION

However, with the above-described prior-art device, since a slit image is cut out by projecting a transmission light image onto a slit plate, the slit image is low in luminance. Improvement of the precision of detection of the image projected onto the image pickup surface of the TV camera was thus desired.

When a fluorescence image, etc. of a semiconductor or biological sample, etc. is to be captured, excitation light is illuminated onto a sample and this excitation light and the fluorescence resulting from the excitation light must be separated from each other. Improved luminance is also desired for such cases. This invention has been made in view of such themes, and an object thereof is to provide an image pickup system by which the precision of detection of light flux emitted from a sample can be improved.

In order to solve the above themes, this invention provides an image pickup system comprising: an optical unit, comprising in turn a cylindrical lens, which, for a light flux emitted from a light source, converges only light flux components of a single direction within a section perpendicular to the direction of propagation of the light flux, and an objective lens, on which the light flux emitted from the cylindrical lens is made incident after it has passed the convergence position, and projecting a slit-shaped light flux onto a sample; a galvanomirror, disposed along the optical path of the abovementioned light flux between the cylindrical lens and objective lens and at the above-mentioned convergence position; and a TV camera, capturing light flux emitted from the sample in accordance with the incidence of the slit-shaped light flux onto the sample.

With this system, since the light flux emitted from the light source is converged in one direction by the cylindrical lens and this light flux is converted into a slit-shaped light flux upon passage through the objective lens, the attenuation of the intensity of the light flux is made less than that in the prior art that uses a slit plate, and since a galvanomirror is disposed at the convergence position of the cylindrical lens, the slit-shaped light flux can be scanned across the sample by the swinging of the galvanomirror.

BRIEF DESCRIPTION OF THE DRAWINGS

FIG. 2A is a perspective view of an optical system of an image pickup system of a type with which time resolution of a slit-shaped light flux is performed.

FIG. 2B is a diagram, showing the cross-sectional shape of a light flux immediately after emission from a laser light source 1.

FIG. 2C is a diagram, showing the cross-sectional shape of the light flux immediately after reflection by mirror M1.

FIG. 2D is a diagram, showing the cross-sectional shape of the light flux immediately after exiting a beam expander BE.

FIG. 2E is a diagram, showing the cross-sectional shape of the light flux that is made incident on a dichroic mirror DC immediately after exiting a cylindrical lens CL.

FIG. 2F is a diagram, showing the cross-sectional shape of the light flux at a galvanomirror 3.

FIG. 2G is a diagram, showing the cross-sectional shape of the light flux at a lens L.

FIG. 2H is a diagram, showing the cross-sectional shape of the light flux immediately after exiting lens L.

FIG. 2I is a diagram, showing the cross-sectional shape of the light flux at an objective lens OL.

FIG. 2J is a diagram, showing the cross-sectional shape of the light flux that has exited objective lens OL and is projected onto a sample S.

FIG. 2K is a diagram, showing the cross-sectional shape of light flux emitted from sample S.

FIG. 2L is a diagram, showing the cross-sectional shape of the modified light flux immediately after passage of the light flux, emitted from sample S, through objective lens OL in the reverse direction.

FIG. 2M is a diagram, showing the cross-sectional shape of the light flux immediately after passage through objective lens OL in the reverse direction.

FIG. 2N is a diagram, showing the cross-sectional shape of the light flux that has passed through lens L in the reverse direction.

FIG. 2O is a diagram, showing the cross-sectional shape of the light flux that is made incident on galvanomirror 3a from the reverse direction.

FIG. 2P is a diagram, showing the cross-sectional shape of the light flux that is made incident on dichroic mirror DC from the reverse direction.

FIG. 2Q is a diagram, showing the cross-sectional shape of the light flux that is made incident on a streak tube ST.

FIG. 4A is a perspective view of an optical system applied to an image pickup system.

FIG. 4B is a diagram, showing the cross-sectional shape of a light flux immediately after emission from a laser light source 1.

FIG. 4C is a diagram, showing the cross-sectional shape of the light flux immediately after reflection by mirror M1.

FIG. 4D is a diagram, showing the cross-sectional shape of the light flux immediately after exiting a beam expander BE.

FIG. 4E is a diagram, showing the cross-sectional shape of the light flux that is made incident on a dichroic mirror DC immediately after exiting a cylindrical lens CL.

FIG. 4F is a diagram, showing the cross-sectional shape of the light flux at a galvanomirror 3.

FIG. 4G is a diagram, showing the cross-sectional shape of the light flux at a lens L.

FIG. 4H is a diagram, showing the cross-sectional shape of the light flux immediately after exiting lens L.

FIG. 4I is a diagram, showing the cross-sectional shape of the light flux at an objective lens OL.

FIG. 4J is a diagram, showing the cross-sectional shape of the light flux that has exited objective lens OL and is projected onto a sample S.

FIG. 4K is a diagram, showing the cross-sectional shape of light flux emitted from sample S.

FIG. 4L is a diagram, showing the cross-sectional shape of the modified light flux immediately after passage of the light flux, emitted from sample S, through objective lens OL in the reverse direction.

FIG. 4M is a diagram, showing the cross-sectional shape of the light flux immediately after passage through objective lens OL in the reverse direction.

FIG. 4N is a diagram, showing the cross-sectional shape of the light flux that has passed through lens L in the reverse direction.

FIG. 4O is a diagram, showing the cross-sectional shape of the light flux that is made incident on galvanomirror 3 from the reverse direction.

FIG. 4P is a diagram, showing the cross-sectional shape of the light flux that is made incident on dichroic mirror DC from the reverse direction.

FIG. 4Q is a diagram, showing the cross-sectional shape of the light flux that is made incident on an image pickup surface of a camera 7.

FIGS. 5A, 5B, 5C, 5D, and 5E are explanatory diagrams, showing images on the image pickup surface of TV camera 7 for times t=1, 2, 3, 4, and 5.

FIGS. 6A, 6B, 6C, 6D, and 6E are graphs, showing spectral distributions obtained by integration of the slit-shaped light flux in the Y direction for times t=1, 2, 3, 4, and 5.

FIGS. 8A, 8B, 8C, and 8D are explanatory diagrams, showing images on the image pickup surface of TV camera 7 for positions Y=1, 2, 3, and 4.

FIGS. 9A, 9B, 9C, and 9D are graphs, showing spectral distributions of the slit-shaped light flux for positions Y=1, 2, 3, and 4.

FIG. 11A is a perspective view of an optical system of a modification example of an optical system applied to an image pickup system.

FIG. 11B is a diagram, showing the cross-sectional shape of a light flux immediately after emission from a laser light source 1.

FIG. 11C is a diagram, showing the cross-sectional shape of the light flux immediately after reflection by mirror M1.

FIG. 11D is a diagram, showing the cross-sectional shape of the light flux immediately after exiting a beam expander BE.

FIG. 11E is a diagram, showing the cross-sectional shape of the light flux that is made incident on a dichroic mirror DC immediately after exiting a cylindrical lens CL.

FIG. 11F is a diagram, showing the cross-sectional shape of the light flux at a galvanomirror 3.

FIG. 11G is a diagram, showing the cross-sectional shape of the light flux at a lens L.

FIG. 11H is a diagram, showing the cross-sectional shape of the light flux immediately after exiting lens L.

FIG. 11I is a diagram, showing the cross-sectional shape of the light flux at an objective lens OL.

FIG. 11J is a diagram, showing the cross-sectional shape of the light flux that has exited objective lens OL and is projected onto a sample S.

FIG. 11K is a diagram, showing the cross-sectional shape of light flux emitted from sample S.

FIG. 11L is a diagram, showing the cross-sectional shape of the modified light flux immediately after passage of the light flux, emitted from sample S, through objective lens OL in the reverse direction.

FIG. 11M is a diagram, showing the cross-sectional shape of the light flux immediately after passage through objective lens OL in the reverse direction.

FIG. 11N is a diagram, showing the cross-sectional shape of the light flux that has passed through lens L in the reverse direction.

FIG. 11O is a diagram, showing the cross-sectional shape of the light flux that is made incident on galvanomirror 3 from the reverse direction.

FIG. 11P is a diagram, showing the cross-sectional shape of the light flux that is made incident on dichroic mirror DC from the reverse direction.

FIG. 11Q is a diagram, showing the cross-sectional shape of the light flux that is made incident on an image pickup surface of a camera 7.

BEST MODE(S) FOR CARRYING OUT THE INVENTION

Embodiments of this invention shall now be described based on the drawings. In the description of the drawings, the same elements are provided with the same symbols and redundant explanations are omitted.

Image pickup systems of the embodiments shall be described below. The same elements are provided with the same symbols and redundant explanations are omitted.

First Embodiment

Figure 1:
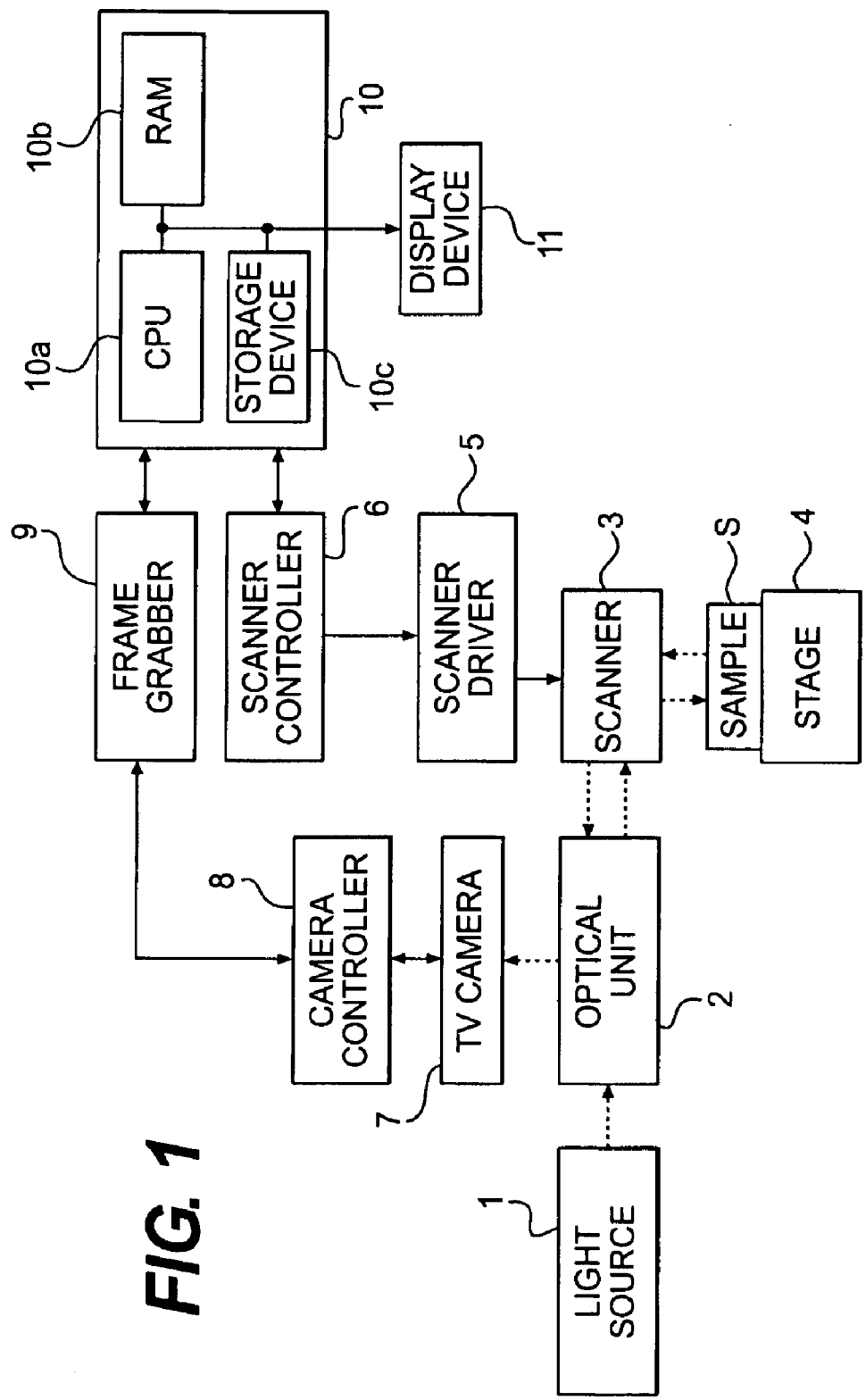
FIG. 1 is a system block diagram of an image pickup system.

FIG. 1 is a system block diagram of an image pickup system.

Illumination light, emitted from a light source 1 that emits laser light, is made to enter an optical unit 2, which forms a slit-shaped light flux, and the slit-shaped light flux emitted from optical unit 2 is projected onto a sample S. Sample S is set on a stage (sample stage) 4. In a case where the light flux is illuminated onto sample S from below, stage 4 is a transparent plate. The slit-shaped light flux that serves as the illumination light is scanned across the surface of sample S in the (X) direction by the driving of a scanner 3 by a scanner driver 5.

A scanner controller 6 generates a synchronization signal for driving scanner driver 5 in accordance with instructions from a computer 10 connected to a display device 11. For the slit-shaped light flux itself, the (Y) direction shall be the length direction.

The reflected light from the sample S that is illuminated by the slit-shaped light flux, or, in a case where the illumination light is excitation light, the light that has been self-generated inside the sample is introduced again into optical unit 2 via scanner 3. Optical unit 2 applies a predetermined process (time resolution (wavelength resolution with a second embodiment)) on the slit-shaped light flux from sample S and projects the light flux onto an image pickup surface of a TV camera 7.

TV camera 7 itself comprises a CCD camera or other solid-state image pickup device, drive signals for the CCD camera are input into the camera from a camera controller 8, and video signals from the CCD camera are input into a frame grabber 9 via camera controller 8.

Frame grabber 9 takes out only video signals of a specific pixel column on the CCD image pickup surface that is arranged by positioning a plurality of pixels in the form of an array. In a case where the video signals from the specific pixel column are output from the CCD t seconds after a reference column of the image pickup surface, frame grabber 9 samples just the video signals t seconds after the reference column and inputs these signals into computer 10. This pixel column is specified by computer 10.

Computer 10 comprises a CPU 10*a*, a RAM 10*b*, and a storage device 10*c* and controls the entire system. Computer 10 controls scanner controller 6, which controls swinging by scanner driver 5, frame grabber 9, and a display device 11. Needless to say, scanner controller 6 and frame grabber 9 may be arranged as computer 10.

While scanner 3 is driven and the slit-shaped light flux is scanned across sample S, the video signals of the specific pixel column (corresponding to time) on the CCD image pickup surface are sampled and taken out by frame grabber 9 and stored in storage device 10*c*. That is, the angle of scanner 3 (position of the slit-shaped light flux in the X direction on sample S) and the data on the light flux of the specific time at this position are stored in a corresponding manner in storage device 10*c* inside computer 10.

An optical system for obtaining the abovementioned time-resolved image shall now be described.

FIG. 2A is a perspective view of optical systems 2 and 3 that are applied to the above-described image pickup system. This optical system is equipped with a laser light source 1, comprising a gas laser 1*a* and a titanium sapphire crystal 1*b* that amplifies light emitted from gas laser 1*a*. FIGS. 2B through 2Q show cross-sectional shapes of light flux at positions indicated by arrows in FIG. 2A. "Cross-sectional shape of a light flux" shall refer to the cross-sectional shape of a light flux in a plane perpendicular to the direction of propagation of the light flux.

As shown in FIG. 2B, the cross-sectional shape, perpendicular to the propagation direction, of a light flux emitted from laser light source 1 is circular, and this light flux is bent in the −Z direction by mirror M1.

As shown in FIG. 2C, the cross-sectional shape of the light flux immediately after reflection by mirror M1 is a circle that surrounds the Z axis. This light flux is made incident on a beam expander BE disposed along the Z axis.

As shown in FIG. 2D, the cross-sectional shape of the light flux immediately after exiting beam expander BE is a circle that is enlarged in diameter. This light flux is made incident on a cylindrical lens CL in a direction perpendicular (Z axis) to the axis (X axis) of the cylindrical surface of cylindrical lens CL. Cylindrical lens CL converges only components of a single direction in the cross section perpendicular to the direction of propagation of the incident light flux. With the present example, since the axis of the cylindrical surface is set to the X axis, only components of the Y direction are converged.

The light flux that is emitted from cylindrical lens CL is made incident on a dichroic mirror DC.

As shown in FIG. 2E, the cross-sectional shape of the light flux that is made incident on dichroic mirror DC immediately after exiting cylindrical lens CL is an ellipse having the X axis as the major axis and the Y axis as the minor axis. Up to the convergence position of cylindrical lens CL, the ratio of this major axis to minor axis increases and at the convergence position, the light flux is formed to a shape that is substantially a slit.

Dichroic mirror DC transmits light of a specific wavelength band and reflects light of the remaining band. With the present example, the light flux that is made incident on dichroic mirror DC from cylindrical lens CL is regarded as having components of the abovementioned remaining band and is thus reflected in the X direction and made incident on galvanomirror 3*a*, which makes up scanner 3. Galvanomirror 3*a* is swung by swinging motor 3*b* based on instructions from scanner controller 6.

As shown in FIG. 2F, the cross-sectional shape of the light flux at a galvanomirror 3*a* is a slit. That is, the light flux that has passed through cylindrical lens CL is converged onto galvanomirror 3*a* while being formed into the shape of a slit. The length direction of this slit-shaped light flux is perpendicular to the swinging axis of the reflecting surface of galvanomirror 3*a*.

Past the convergence position, the slit-shaped light flux, which serves as the illumination light that is reflected by galvanomirror 3*a*, diverges from this position and this light flux is made incident on an objective lens OL via a pupil projection lens L.

As shown in FIG. 2G, the cross-sectional shape of the light flux at pupil projection lens L is an ellipse with the major axis in the Y-axis direction and the minor axis in the X-axis direction.

As shown in FIG. 2H, the cross-sectional shape of the light flux immediately after exiting pupil projection lens L is a shape that is reduced in the ratio of the major axis to the minor axis. Objective lens OL is positioned at the focus position of pupil projection lens L. Directional components that were not converged by cylindrical lens CL are thus converged by pupil projection lens L and converged onto objective lens OL. Since the components that have been converged by cylindrical lens CL are converged once onto galvanomirror 3*a*, these component already begin to diverge at the point of incidence onto pupil projection lens L and are thus projected onto the objective lens as substantially parallel light.

As shown in FIG. 2I, the cross-sectional shape of the light flux at an objective lens OL is a slit shape with the X axis being the length direction.

FIG. 2J shows the cross-sectional shape of the light flux that has exited objective lens OL and is projected onto a sample S. Past objective lens OL, the components that were converged by pupil projection lens L tend to diverge and the components that were not converged by pupil projection lens L tend to converge. A slit-shaped light flux having the length in the direction of the Y axis is thus projected onto sample S. Since galvanomirror 3*a* is swung by being controlled in rotation angle, the surface of sample S is scanned in the X direction by the slit-shaped light flux.

FIG. 2K shows the cross-sectional shape of light flux emitted from sample S, and the shape of this light flux is the same slit shape as that of the incident light on sample S. Sample S emits fluorescence in accordance with the incident light (excitation light), and the emitted light from sample S propagates in reverse from sample S in the direction of objective lens O. This light shall be the sample light.

FIG. 2L shows the cross-sectional shape of the modified light flux immediately after passage of the light flux (sample light), emitted from sample S, through objective lens OL in the reverse direction, and FIG. 2M shows the cross-sectional shape of the light flux (sample light) immediately after passage through objective lens OL in the reverse direction. The sample light is converged once by objective lens OL and is made a slit-shaped light flux. This convergence position is in a conjugate relationship with respect to sample S.

FIG. 2N shows the cross-sectional shape of the light flux (sample light) that has passed through lens L in the reverse direction and FIG. 2O shows the cross-sectional shape of the light flux that is made incident on galvanomirror 3a from the reverse direction. On galvanomirror 3a, the cross-sectional shape of the sample light is a circle. That is, galvanomirror 3a and the exit pupil of objective lens OL are positioned at conjugate positions.

Since the sample light differs in wavelength band from the incident light, after being reflected by galvanomirror 3a, the sample light is made incident on dichroic mirror DC from the reverse direction and is transmitted through dichroic mirror DC. FIG. 2P shows the cross-sectional shape of the light flux (sample light) that is made incident on dichroic mirror DC from the reverse direction.

After transmission through dichroic mirror DC, a predetermined wavelength band of the sample light is selected by passage through a barrier filter F and the sample light is then converged by a condenser lens L' and made incident on a streak camera as a slit-shaped light flux having the length in the direction of the Y axis on the sample surface. The streak camera performs the abovementioned time resolution.

The streak camera comprises a streak tube ST, on which the abovementioned slit-shaped light flux is made incident, a TV camera 7, which opposes the light exiting face of streak tube ST, and a coupling optical system, which couples images emitted from streak tube ST to TV camera 7.

FIG. 2Q shows the cross-sectional shape of the light flux that is made incident on streak tube ST. Streak tube ST has a slit on a light incident surface, and the length direction of this slit is matched with the length direction of the slit-shaped light flux that is made incident thereon. Streak tube ST performs photoelectric conversion of the slit-shaped light flux that is made incident thereon, deflects the generated photoelectrons in a periodic manner by a deflection device, performs time resolution in the deflection direction of the slit-shaped light flux along the deflection direction as a slit-shaped electron image, and makes this electron image be incident on a fluorescent screen. Since the fluorescent screen emits light in accordance with the electron image, the slit-shaped light flux, which has been subject to time resolution along the deflection direction, is spatially resolved in accordance with time and the slit-shaped light flux for each time period is successively projected from the streak tube ST onto different positions of the image pickup surface of TV camera 7.

At TV camera 7, a slit-shaped light flux of a specific sample position is subject to time resolution and detected. Since computer 10 swings galvanomirror 3a so that the slit-shaped light flux is scanned as illumination light across the entire surface (observation range) of sample S, time-resolved data of the slit-shaped light flux for all positions become stored in storage device 10c. By synthesizing the slit-shaped light fluxes, each of a specific time T seconds after the start or end of illumination of the slit-shaped light flux that is the illumination light, for all positions, a sample image T seconds after light illumination can be obtained, and this sample image can be displayed on display device 11.

Such time-resolved slit-shaped light fluxes are useful for two-photon time-resolved fluorescence detection. When an image pickup method using the present image pickup system is applied to two-photon time-resolved fluorescence detection, since the duration of illumination of light flux per pixel can be set longer in comparison to a normal spot-scanning type two-photon fluorescence microscope, if the S/N ratio may be the same as that in the conventional case, the intensity of the light flux (excitation light) can be lowered to restrain degradation of sample S by the illumination of excitation light.

Figure 3:
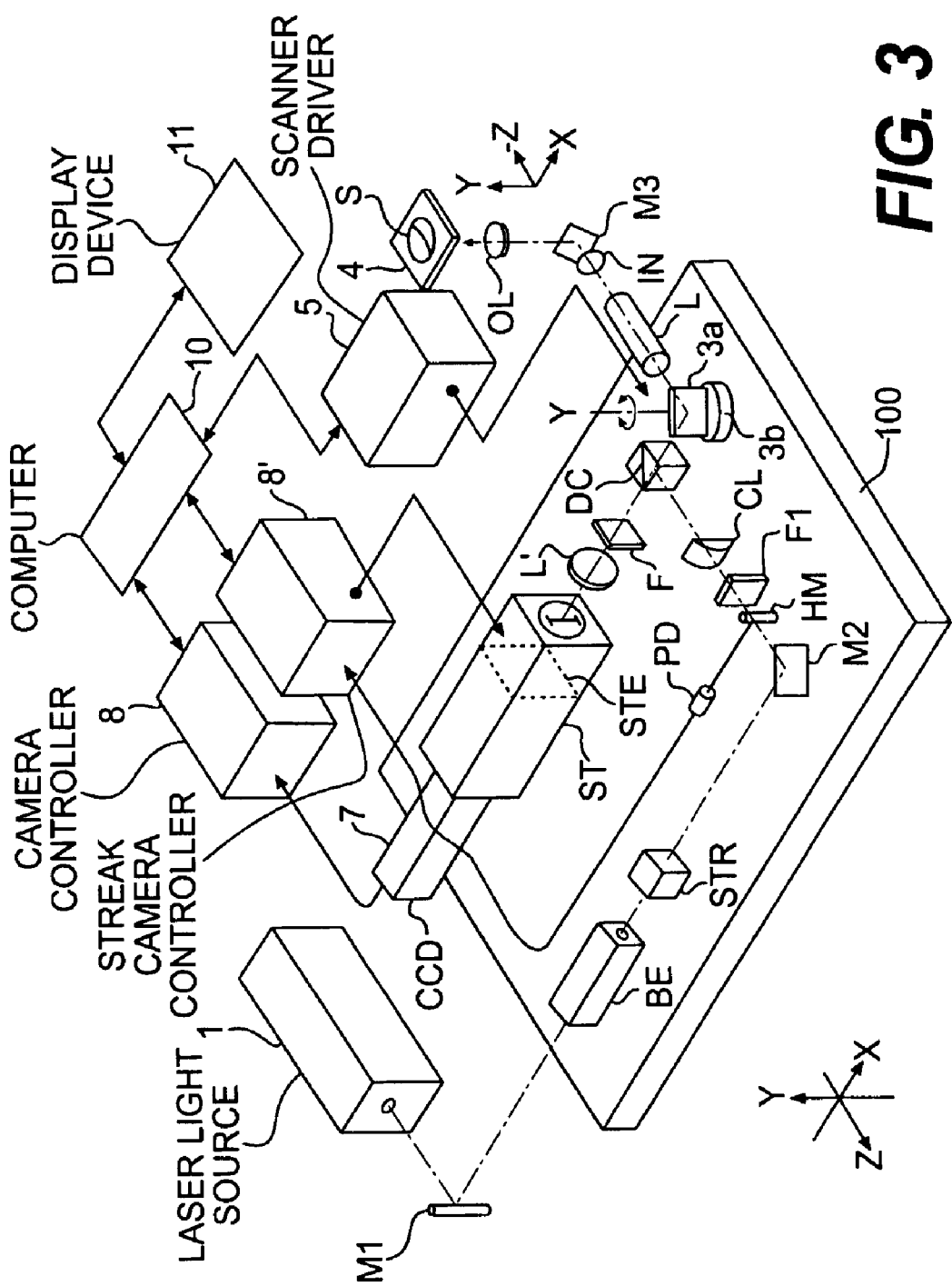
FIG. 3 is a perspective view of an image pickup system arranged by incorporating the optical system shown in FIG. 2A in an actual device.
Figure 7A:
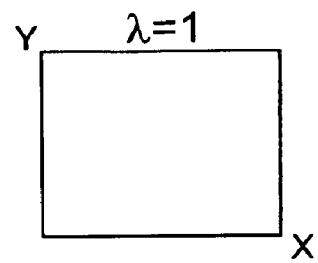
FIGS. 7A, 7B, 7C, 7D, 7E, and 7F are explanatory diagrams, showing sample images synthesized for λ=1, 2, 3, 4, 5, and 6.
Figure 7B:
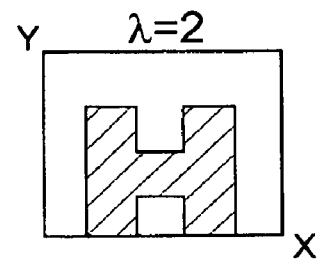
Figure 7C:
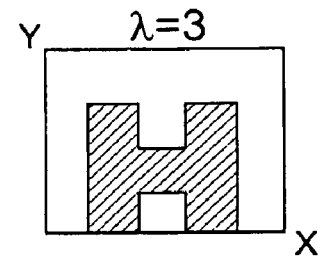
Figure 7D:
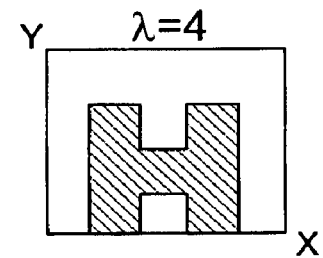
Figure 7E:
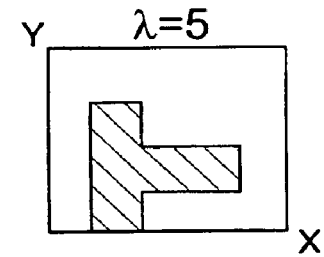
Figure 7F:
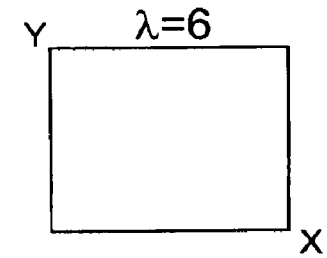

FIG. 3 is a perspective view of an image pickup system arranged by incorporating the optical system shown in FIG. 2A in an actual device. The same symbols indicate the same elements, and the illustrated parts are set on a supporting base 100.

Laser light flux, emitted from a laser light source 1, is reflected by a mirror M1, expanded in diameter by a beam expander BE, controlled in passage as necessary by a shutter STR, reflected by a mirror M2, and made incident on a dichroic cube (dichroicmirror) DC via a filter F1, inserted inside a filter holder, and a cylindrical lens CL.

Dichroic mirror DC reflects light that has been made incident from the direction of cylindrical lens CL and the reflected light flux is made incident on a galvanomirror 3a. Galvanomirror 3a makes up a scanner 3 along with a motor 3b and is swung in accordance with a control signal from a scanner driver 5.

The light flux that is reflected by galvanomirror 3a is input into an optical input port IN of a microscope unit via a pupil projection lens L. The input light flux is reflected upwards by a mirror M3, converged by an objective lens OL, transmitted through a transparent plate 4 from below, and illuminated from below as a slit-shaped light flux onto a sample S disposed on transparent plate 4.

Slit-shaped sample light, which is emitted from sample S, is transmitted successively via objective lens OL, mirror M3, pupil projection lens L, galvanomirror 3a, dichroic mirror DC, filter F, and condenser lens L' and is projected as a slit-shaped light flux onto an incident surface of a streak tube ST.

By applying a suitable sweep voltage from a streak camera controller 8' to a deflection electrode STE of streak tube ST, an electron image resulting from photoelectric conversion by streak tube ST is deflected and scanned, and after conversion of this electronic image into fluorescent light, the fluorescence light is captured by a TV camera 7. For the deflection timing, a signal from a photodetector PD, which monitors light that has been reflected by a half-mirror HM disposed at the illustrated position, is used. That is, the time of the output of photodetector PD is set as a reference time (t0=0) and this reference time is used as a reference point for the starting time of deflection.

Video signals output from TV camera 7 are input via a camera controller 8 to a computer 10 and displayed on a display device 11. With the present example, the scanner controller 6 and frame grabber 9 shown in FIG. 1, are incorporated in computer 10.

As has been described above, the above image pickup system is equipped with optical unit 2, which is equipped in turn with cylindrical lens CL, which, for a light flux emitted from light source 1, converges only light flux components of a single direction within a section perpendicular to the direction of propagation of the light flux, and objective lens OL, on which the light flux emitted from cylindrical lens CL is made incident after the light flux has passed the convergence position of cylindrical lens CL, and projects a slit-shaped light flux onto sample S, galvanomirror 3a, which is disposed along the optical path of the abovementioned light flux between cylindrical lens CL and objective lens OL and at the abovementioned convergence position, and TV camera 7, which captures the light flux emitted from sample S in accordance with the incidence of the slit-shaped light flux onto sample S.

With this system, since the light flux emitted from light source 1 is converged in one direction by cylindrical lens CL and this light flux is converted into a slit-shaped light flux via objective lens OL, the attenuation of the intensity of the light flux is made less than that in the prior art that uses a slit plate, and since galvanomirror 3a is disposed at the convergence position of cylindrical lens CL, the slit-shaped light flux can be scanned across sample S by swinging of galvanomirror 3a.

Applicable image pickup modes of the above-described image pickup device are described below.

(1) Delayed Fluorescence Acquisition Mode

Sample S is arranged to be excitable by illumination of laser light, and after emission of laser light from laser light source 1 and projection of a slit-shaped laser light flux onto sample S (the time of projection being set to t0), the slit-shaped excitation light emitted from sample S is subject to time-resolved capture by a streak camera (for example, captured at times t0+Δt, t0+2Δt, t0+3Δt, and t0+4Δt). After scanning the slit-shaped laser light flux across the observed range of sample S by swinging galvanomirror 3a, slit-shaped images, captured at a time (for example, t0+3Δt) little after each excitation time (t0), are synthesized at computer 10 and displayed on display device 11. In this case, images of just substances of long fluorescence lifetime can be captured selectively. As seen by human eyes, the images are displayed in real time.

(2) Simplified Fluorescence Lifetime Acquisition Mode

The differences with respect to (1) above are that slit-shaped light flux images (indicated as I1 and I2) are captured at two points in time after excitation, for example, at t1=t0+Δt and t2=t0+3Δt, computer 10 is made to compute I1/I2, and images are then synthesized in correspondence to the slit-shaped image by computer 10 and displayed on display device 11. In this case, since the computed values differ according to the lifetimes of regions within sample S, simplified mapping of the fluorescence lifetime scan be performed. As seen by human eyes, the images are displayed in real time.

(3) Fluorescence Lifetime Acquisition Mode

This mode differs from (2) above in the method of computation. Since slit-shaped sample images of all time points (t0+Δt, t0+2Δt, . . . ) are captured for the range within the observed range by the swinging of galvanomirror 3a, graphs, indicating the temporal attenuation characteristics of the intensity (luminance) of fluorescence emitted from sample S, that is, fluorescence lifetime curves are determined for each pixel of the image pickup surface of TV camera 7 based on the intensities of the sample images, and, for each pixel, the time (fluorescence lifetime) at which 1/e-th of the maximum luminance value of the corresponding curve is obtained is calculated. This fluorescence lifetime can be calculated more rigorously using a priorly measured device constant and deconvoluting the abovementioned fluorescence lifetime curve.

This system can be modified from the above-described time resolving arrangement to a wavelength resolving arrangement.

Second Embodiment

FIG. 4A is a perspective view of an optical system of an image pickup system of type that performs time resolution of a slit-shaped light flux. FIGS. 4B, 4C, 4D, 4E, 4F, 4G, 4H, 4I, 4J, 4K, 4L, 4M, 4N, 4O, 4P, and 4Q show cross-sectional shapes of the light flux at the points indicated by arrows in FIG. 4A. FIGS. 4B through 4Q are basically the same as FIGS. 2B through 2Q.

The device arrangement is substantially the same as that shown in FIG. 2, but whereas with the above-described arrangement, light flux that has been subject to time resolution using streak tube ST is captured by TV camera 7, in the following arrangement, light flux subject to wavelength resolution by use of a diffraction grating G in place of streak tube T is captured using TV camera 7. Put in another way, streak tube ST in the above-described time resolving device arrangement is omitted and a diffraction grating G for wavelength resolution is employed instead in this device to perform resolution in terms of wavelength instead of time.

The system arrangement of the present embodiment up to transmission through dichroic mirror DC is the same as that of the above-described embodiment. A predetermined wavelength band of the sample light that has been transmitted through dichroic mirror DC is selected by barrier filter F and is made incident as a slit-shaped light flux having the length in the direction of the Y axis on a transmission type diffraction grating (spectroscope) G.

Diffraction grating G performs wavelength resolution, that is, spectrally resolves the incident slit-shaped light flux along the X direction of the coordinates on sample S and then emits the light flux. The image of the light flux that has been subject to wavelength resolution is formed via condenser lens L' on the image pickup surface of TV camera 7. FIG. 4Q shows the cross-sectional shape, in the plane perpendicular to the light flux (sample light), of the light flux that is made incident on the image pickup surface of camera 7.

Referencing FIG. 1, with the present device, while driving scanner 3 and thereby scanning the slit-shaped light flux across sample S, video signals of a specific pixel column (corresponding to a wavelength) on the CCD image pickup surface of TV camera 7 are sampled and taken out by means of frame grabber 9 and stored in storage device 10c. That is, the angle of scanner 3 (position of the slit-shaped light flux in the X direction on sample S) and the data on the light flux of the specific wavelength at this position are stored in a corresponding manner in storage device 10c inside computer 10.

Let, the X-direction positions of the slit-shaped light flux on sample S at times t=1, 2, 3, 4, and 5 be X=1, 2, 3, 4, and 5. Let the Y-direction position of the slit-shaped light flux on sample S be Y and the wavelength be λ. The units of these shall be arbitrary constants.

FIGS. 5A, 5B, 5C, 5D, and 5E are explanatory diagrams, showing images on the image pickup surface of TV camera 7 for times t=1, 2, 3, 4, and 5. FIGS. 6A, 6B, 6C, 6D, and 6E are graphs, showing spectral distributions obtained by integration of the slit-shaped light flux in the Y direction for times t=1, 2, 3, 4, and 5.

For example, to obtain a sample image for wavelength λ=2, computer 10 instructs frame grabber 9 to sample video signals of the pixel column of λ=2 in FIGS. 5A through 5E. Data of a slit-shaped light flux of λ=2 at the X-direction position of the slit-shaped light flux on sample S are thereby obtained along the X direction, and by synthesizing these data, the sample image for wavelength λ=2 is obtained.

FIGS. 7A, 7B, 7C, 7D, 7E, and 7F are explanatory diagrams, showing sample images synthesized for λ=1, 2, 3, 4, 5, and 6. The data indicated in FIGS. 5A through 7F are displayed on display device 11.

Since data (X, Y, λ(or time T)) on the surface of sample S can be obtained by repeating scanning of the slit-shaped light flux, computer 10 can rearrange these data to prepare images that indicate relationships between λ and X.

Figure 10:
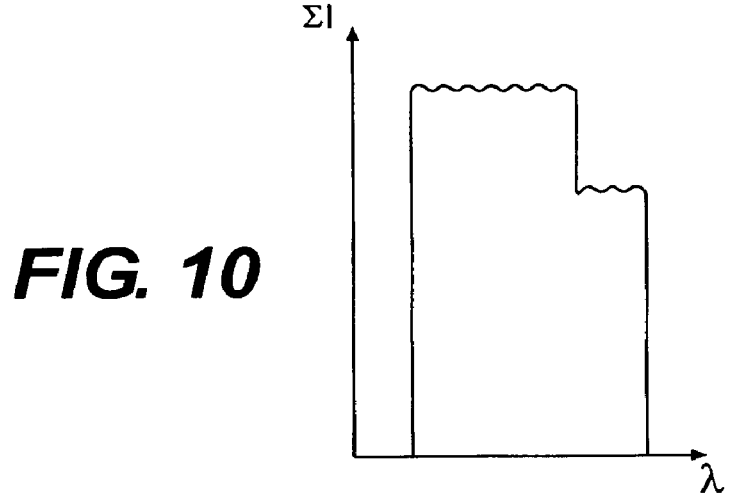
FIG. 10 is a graph, showing the integrated spectral distribution of the entire observed range of the sample.

FIGS. 8A, 8B, 8C, and 8D are explanatory diagrams, showing images on the image pickup surface of TV camera 7 for positions Y=1, 2, 3, and 4. FIGS. 9A, 9B, 9C, and 9D are graphs, showing spectral distributions of the slit-shaped light for positions Y=1, 2, 3, and 4. By integrating the spectral (luminance I) distributions shown in FIGS. 9A through 9D, a graph indicating an integrated spectral distribution of the entire observed range of the sample can be obtained as shown in FIG. 10.

Third Embodiment

FIG. 11A is a perspective view of an optical system of a modification example of an optical system applied to an image pickup system. FIGS. 11B, 11C, 11D, 11E, 11F, 11G, 11H, 11I, 11J, 11K, 11L, 11M, 11N, 11O, 11P, and 11Q show cross-sectional shapes of the light flux at the points indicated by arrows in FIG. 11A. The arrangement of FIG. 11A differs from that of FIG. 4A only in that diffraction grating G is made to provide the converging function of condenser lens L' and condenser lens L' is omitted. In other words, optical part G is a condenser lens on which a diffraction grating has been formed on its surface.

FIGS. 11B through 11Q are the same as FIGS. 4B through 4Q. The above-described wavelength resolution can be performed with such a system as well.

As has been described above, with each of the image pickup systems of the above-described embodiments, scanning across sample S by a slit-shaped light flux of high light intensity can be performed by use of cylindrical lens CL, galvanomirror 3a, and objective lens L.

Also this image pickup system is equipped with a dichroic mirror DC, which is disposed along the optical path of the light beam between cylindrical lens CL and galvanomirror 3a and reflects components of a predetermined wavelength band in the direction of galvanomirror 3a, and the light flux that is emitted from sample S is made incident on a TV camera via objective lens OL, galvanomirror 3a, and dichroic mirror DC, successively. In this case, since light from the sample can be taken out selectively, image capturing of high precision can be performed.

Also, the image pickup system according to the second or third embodiment is equipped with a spectroscope G that is disposed in front of TV camera 7 and can capture images upon subjecting a slit-shaped light flux to wavelength resolution.

Also, the image pickup system according to the first embodiment is equipped with a streak tube ST that is disposed in front of TV camera 7 and can capture images upon subjecting a slit-shaped light flux to time resolution.

The image pickup system according to the first embodiment is also equipped with a transparent plate 4, on top of which sample S is placed and the light flux that exits objective lens OL is projected from below onto the top of sample S via transparent plate 4, thus providing the advantage that a fluorescent reagent, etc. can be mixed into sample S from above, etc., with sample S being set on transparent plate 4. Such an arrangement shown in FIG. 3 may also be applied to the image pickup system according to the second or third embodiment. With the arrangement of the image pickup system according to the second or third embodiment, resolution by wavelength can be switched to resolution in time.

Also, though the above-described optical systems were arranged as epi-illumination type arrangements, they could be arranged as transmission type arrangements as well. In such a case, an optical element by which the light flux is made to reciprocate through the sample is added.

Though a digital camera using a CCD was used as TV camera 7, a MOS type image sensor may be used instead. Also, integration (binning) may be performed prior to reading out data from the respective pixels, and in such a case, the effect of raising the video signal reading speed while lowering the wavelength resolution or image resolution or of keeping a constant speed and improving the S/N can be anticipated.

Since the abovementioned data of the slit-shaped light flux are the luminance data of the respective pixels and the data on positions on the sample surface, by storing all of the data in storage device 10c, images can be reconstructed and displayed as necessary.

INDUSTRIAL APPLICABILITY

This invention can be used as an image pickup system.
What is claimed is:
1. An image pickup system comprising:
   an optical unit, comprising in turn a cylindrical lens, which, for a light flux emitted from a light source, converges only light flux components of a single direction within a section perpendicular to the direction of propagation of the light flux;
   an objective lens, on which said light flux emitted from said cylindrical lens is made incident after the light flux has passed the convergence position and which guides said light flux to a sample, and projecting a slit-shaped light flux onto said sample;
   a galvanomirror, disposed along the optical path of said light flux between said cylindrical lens and said objective lens and at said convergence position;
   a TV camera, capturing light flux emitted from said sample in accordance with the incidence of said slit-shaped light flux onto said sample; and
   a dichroic mirror, disposed along the optical path of said light beam between said cylindrical lens and said galvanomirror and reflecting components of a predetermined wavelength band in the direction of said galvanomirror, wherein the light flux that is emitted from said sample is made incident on said TV camera via said objective lens, said galvanomirror, and said dichroic mirror, successively.

2. The image pickup system as set forth in claim 1, furthermore comprising a spectroscope, disposed in front of said TV camera.

3. The image pickup system as set forth in claim 1, furthermore comprising a streak tube, disposed in front of said TV camera.

4. The image pickup system as set forth in claim 1, furthermore comprising a transparent plate, on top of which said sample is placed, wherein the light flux that has exited said objective lens is projected from below onto the top of said sample via said transparent plate.

* * * * *